US007121564B2

(12) United States Patent
Hassell

(10) Patent No.: US 7,121,564 B2
(45) Date of Patent: Oct. 17, 2006

(54) TRASH CART

(75) Inventor: Jon P. Hassell, Altanta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 143 days.

(21) Appl. No.: 10/498,602

(22) PCT Filed: Dec. 5, 2002

(86) PCT No.: PCT/US02/38767

§ 371 (c)(1),
(2), (4) Date: Jun. 9, 2004

(87) PCT Pub. No.: WO03/050017

PCT Pub. Date: Jun. 19, 2003

(65) Prior Publication Data

US 2005/0029763 A1 Feb. 10, 2005

Related U.S. Application Data

(60) Provisional application No. 60/338,430, filed on Dec. 6, 2001.

(51) Int. Cl.
*B62B 1/00* (2006.01)
*B62B 1/10* (2006.01)

(52) U.S. Cl. .............................. 280/47.26; 280/47.24; 280/47.17; 280/47.131

(58) Field of Classification Search ............. 280/47.26, 280/47.131, 47.24, 79.2; 220/908
See application file for complete search history.

(56) References Cited

U.S. PATENT DOCUMENTS 912,095 A * 2/1909 Eason ........................ 220/318
3,384,385 A 5/1968 Cohen et al.
3,830,514 A 8/1974 Green
4,724,681 A * 2/1988 Bartholomew et al. ....... 62/239
5,163,577 A 11/1992 Lee
D347,095 S 5/1994 Apps
D388,577 S 12/1997 Rehrig
D398,120 S 9/1998 Rehrig
D410,125 S 5/1999 Rehrig et al.
5,899,468 A 5/1999 Apps
6,036,204 A 3/2000 Craft et al.
6,257,441 B1 * 7/2001 Maley ........................ 220/840
D478,197 S 8/2003 Raghunathan
2002/0153681 A1 10/2002 Young

FOREIGN PATENT DOCUMENTS

CA 2 344 843 11/2001
DE 830 171 1/1952
DE 11 91 740 4/1965

(Continued)

OTHER PUBLICATIONS

Brochure—Milko Der Milko 42-Liter Rollerbehalter Minimale Abmessungen Maximaler Vorteil—2 pages—dated 1996.

*Primary Examiner*—Christopher P. Ellis
*Assistant Examiner*—Vaughn Coolman

(57) ABSTRACT

A trash cart has a body with an upper body portion defining an opening for loading and unloading trash from the body; a lid for closing the opening of the body; and a handle member which is pivotably attached to a rear portion of the upper body portion. When the handle member is oriented in a first position it cooperates with the lid to impede movement of the lid, and when the handle member is oriented in a second position, the lid is able to freely open.

20 Claims, 14 Drawing Sheets

FOREIGN PATENT DOCUMENTS

| | | | |
|---|---|---|---|
| DK | 9 500 261 | U | 10/1996 |
| EP | 1 106 535 | | 6/2001 |
| EP | 1 157 946 | A | 11/2001 |
| GB | 2 338 942 | A | 1/2000 |
| WO | WO 97 46468 | A1 | 12/1997 |
| WO | WO 03/050017 | A1 | 6/2003 |

* cited by examiner

TRASH CART

This application is a U.S. National Stage Application under 35 U.S.C. §371 of International Application No. PCT/US02/38767 filed Dec. 5, 2002, which claims priority to U.S. Provisional Application Ser. No. 60/338,430, filed Dec. 6, 2001.

BACKGROUND OF THE INVENTION

1. Field of the Invention

The present invention relates to a trash cart.

2. Background Art

Trash carts, and particularly large roll-out trash carts, are widely used by and provided to residents by municipalities in order to make storage and collection of household trash more convenient. Unfortunately, many larger trash carts (such as the industry standard 96 gallon or 40 liter models) are often difficult to handle and maneuver. This is especially true when the trash cart is full and heavy due to the trash contained within. In many trash carts, the only space available for a user to grasp is the pivoted area where the lid attaches to the body of the trash cart. Unfortunately, grasping this location may not provide the user with the most efficient way of handling the container when full.

Accordingly, an improved trash cart is desired which provides a user with ease of handling and maneuverability, particularly when the container is a relatively large roll-out cart.

SUMMARY OF THE INVENTION

It is an object according to the present invention to provide a trash cart with a handle member that is capable of securing the lid to the body of the cart.

It is another object according to the present invention to provide a trash cart with a handle member that is capable of being used as a means to maneuver the trash cart.

In keeping with the teachings according to the present invention, provided is a trash cart having a body with an upper body portion defining an opening for loading and unloading trash from the body; a lid for closing the opening of the body; and a handle member which is pivotably attached to a rear portion of the upper body portion. When the handle member is oriented in a first position it cooperates with the lid to impede movement of the lid, and when the handle member is oriented in a second position, the lid is able to freely open.

Also provided according to the present invention is a trash cart including a hollow body having an upper portion defining an opening for loading and unloading waste therefrom; a lid for closing said opening for loading and unloading trash from the hollow body; and a handle member pivotably attached to the upper body portion. When the handle member is rotated in a forward position it cooperates with the lid to impede movement of the lid, and when the handle member is oriented in a rearward position, the lid is able to be opened.

The lid may be pivotably attached to the body along a hinge axis. In some embodiments, the handle member may also pivot relative to the lid and body along the same hinge axis, and in other embodiments, the handle member is disposed along a different hinge axis.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
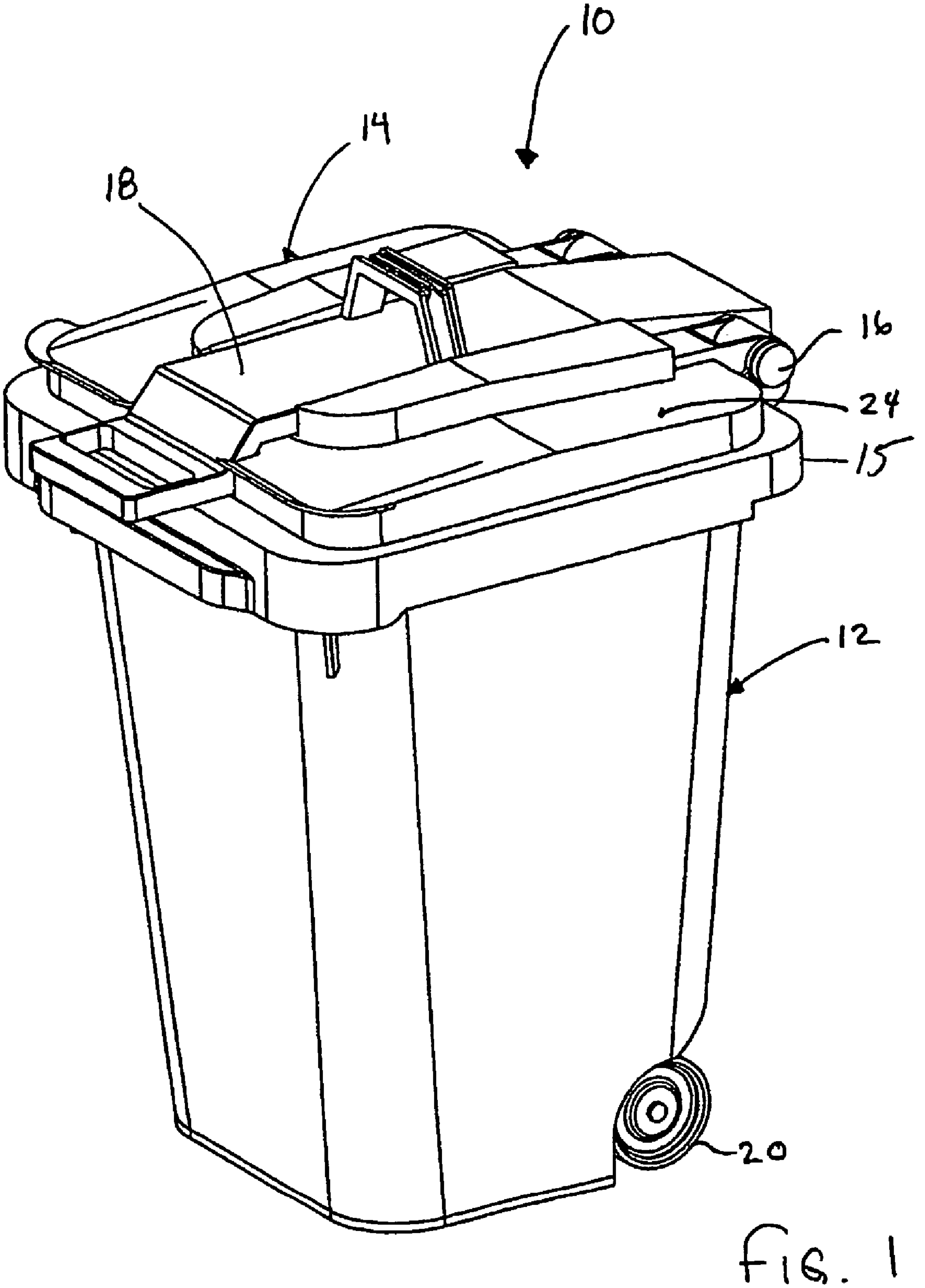
FIG. 1 is a perspective view of a first embodiment of a trash cart according to the present invention, with the handle member in a closed/locked position.

FIGS. 1–7 illustrate a first embodiment of a trash cart 10 according to present invention. Cart 10 includes a generally hollow body portion 12 and a lid member 14 which are pivotably and rotatably connected to each other by hinge member 16. Cart 10 also includes a handle member 18 which is also attached to body portion 12 by hinge member 16, and which pivots and rotates relative to body portion 12 and lid 14 about the axis of hinge 16. Body portion 12, lid 14 and handle member 18 are each preferably formed of a plastic material such as HDPE, via an injection molding process, but may of course be formed by other methods lending itself to this design.

Body portion 12 has an upper portion 15 defining an opening 17 for loading and unloading trash from hollow body portion 12. Lid 14 serves to close opening 17 of body portion 12. Cart 10 may also include wheels 20 supported for rotation by bottom 13 of body portion 12, and which rotate about axle 21 connected to body portion 12, such that a user may maneuver cart 10 by rolling it. Cart 10 may be used for all types of waste, including organic, etc.

According to the teachings of the present invention, handle member 18 allows a user to easily and efficiently handle and maneuver trash cart 10. This feature is particularly useful when the trash cart is relatively large in size, or when it is full or heavy. FIG. 1 shows handle member 18 in a closed and preferably locked position. With addition reference to FIG. 2, handle member 18 in the closed position is received within a recess 22 via a slight interference fit on the upper surface 24 of lid 14. In the embodiment shown, upper surface of handle member 18 and the surrounding portion upper surface 24 of lid 14 are flush and coplanar. Handle member 18 also includes a first handling portion 30 and a second handling portion 32. First handling portion 30 is horizontally disposed at the front of handle member 18 and provides sufficient opening and clearance 31 therein for receiving a user's hand therein. Second handle portion 32 is vertically disposed generally in the central area of handle member 18, and also provides sufficient opening and clearance 33 for receiving a user's hand therein.

Figure 2:
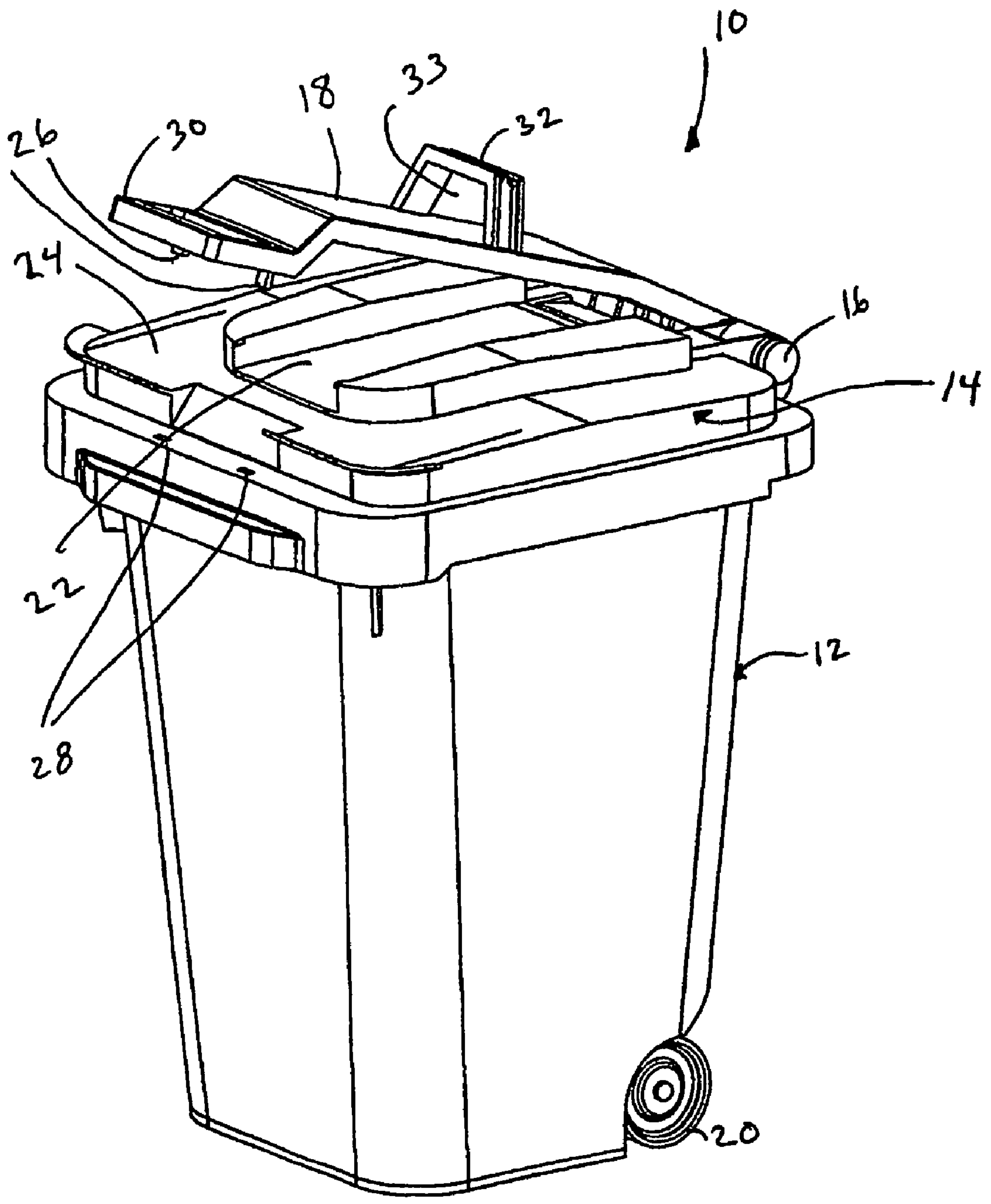
FIG. 2 is a perspective view of the first embodiment, showing the handle member in a slightly raised and pivoted orientation.
Figure 3:
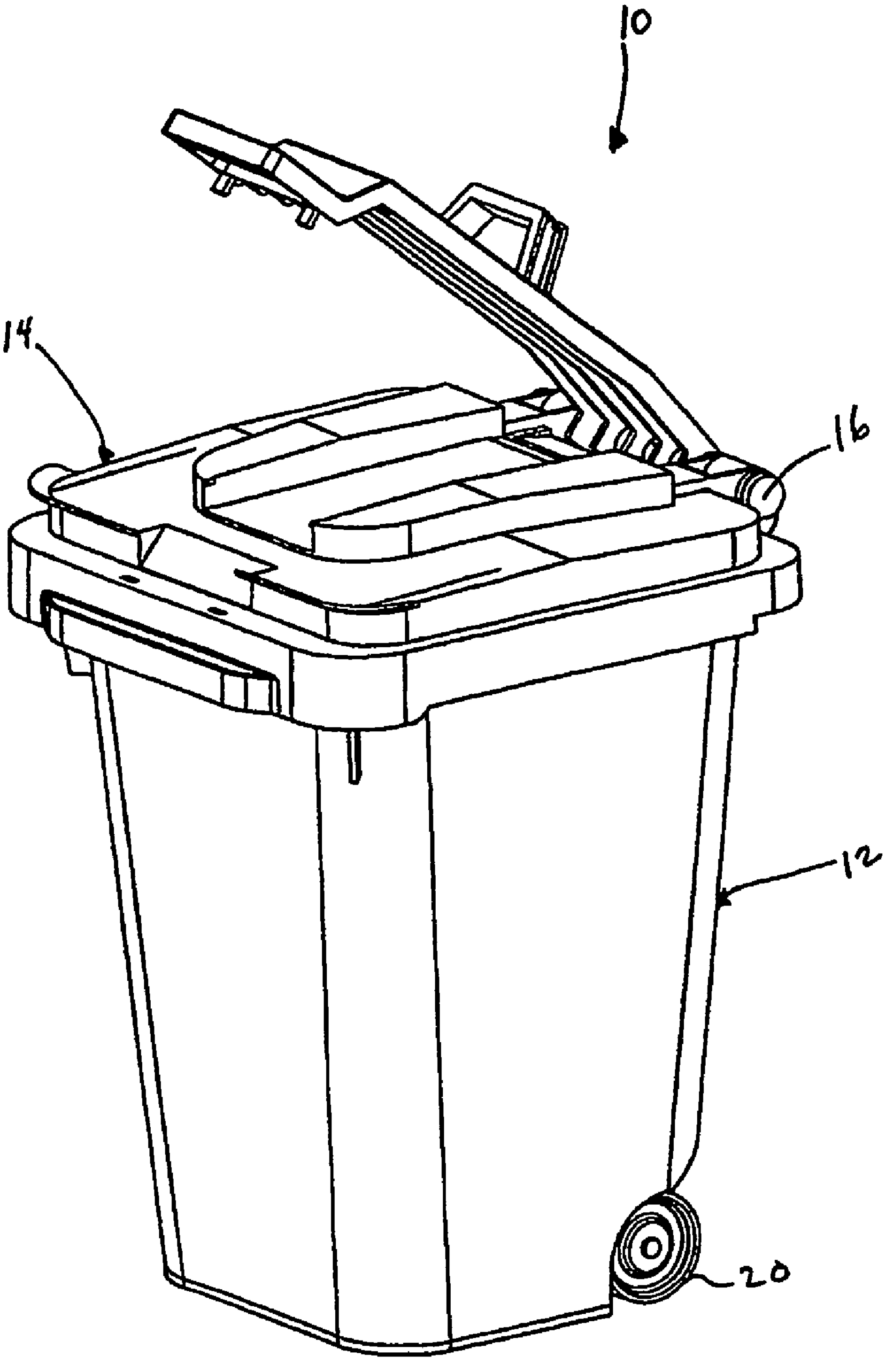
FIG. 3 is another perspective view of the first embodiment, showing the handle member in a second raised and pivoted orientation.
Figure 4:
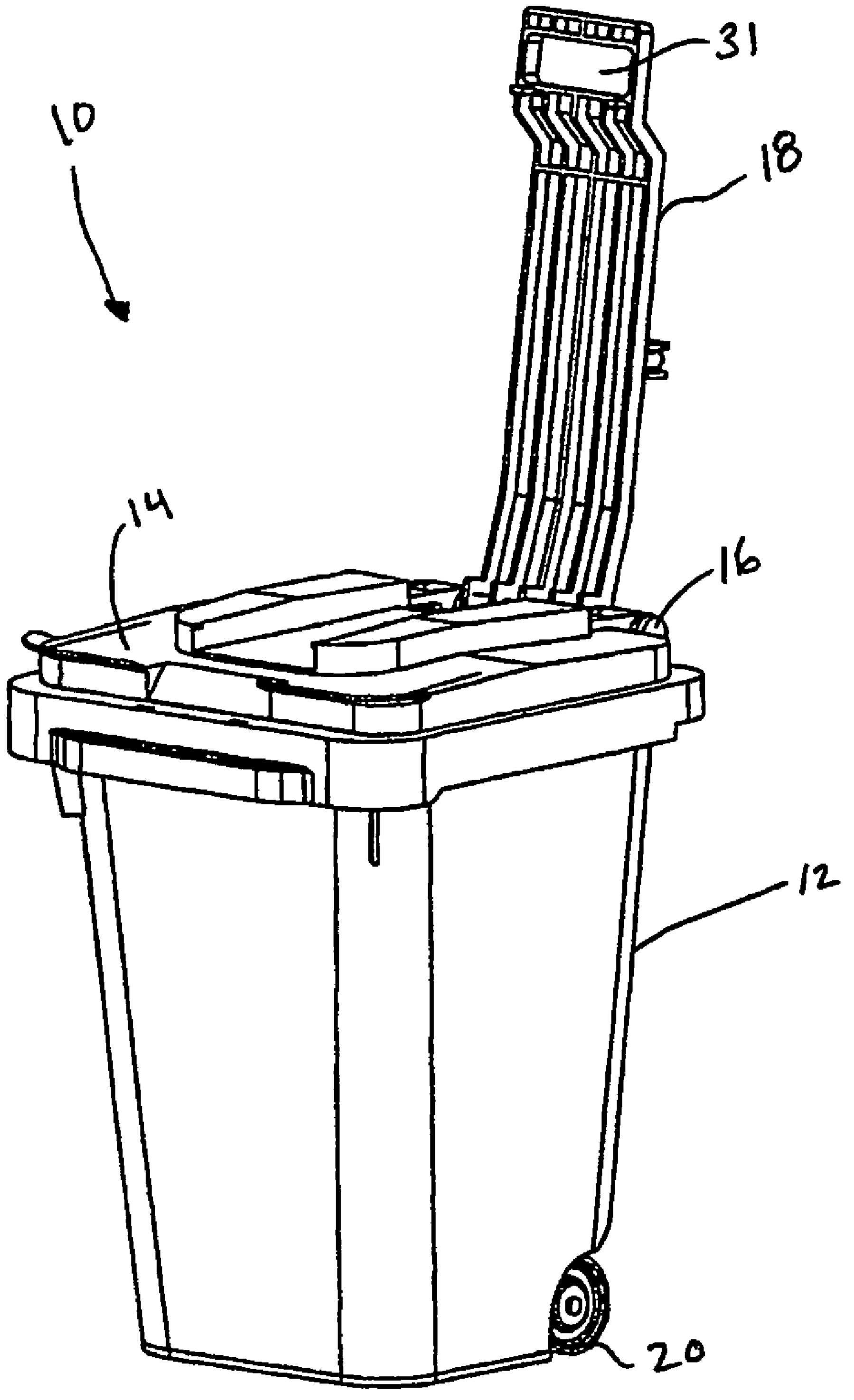
FIG. 4 is another perspective view of the first embodiment, showing the handle member in a fully open orientation.
Figure 5:
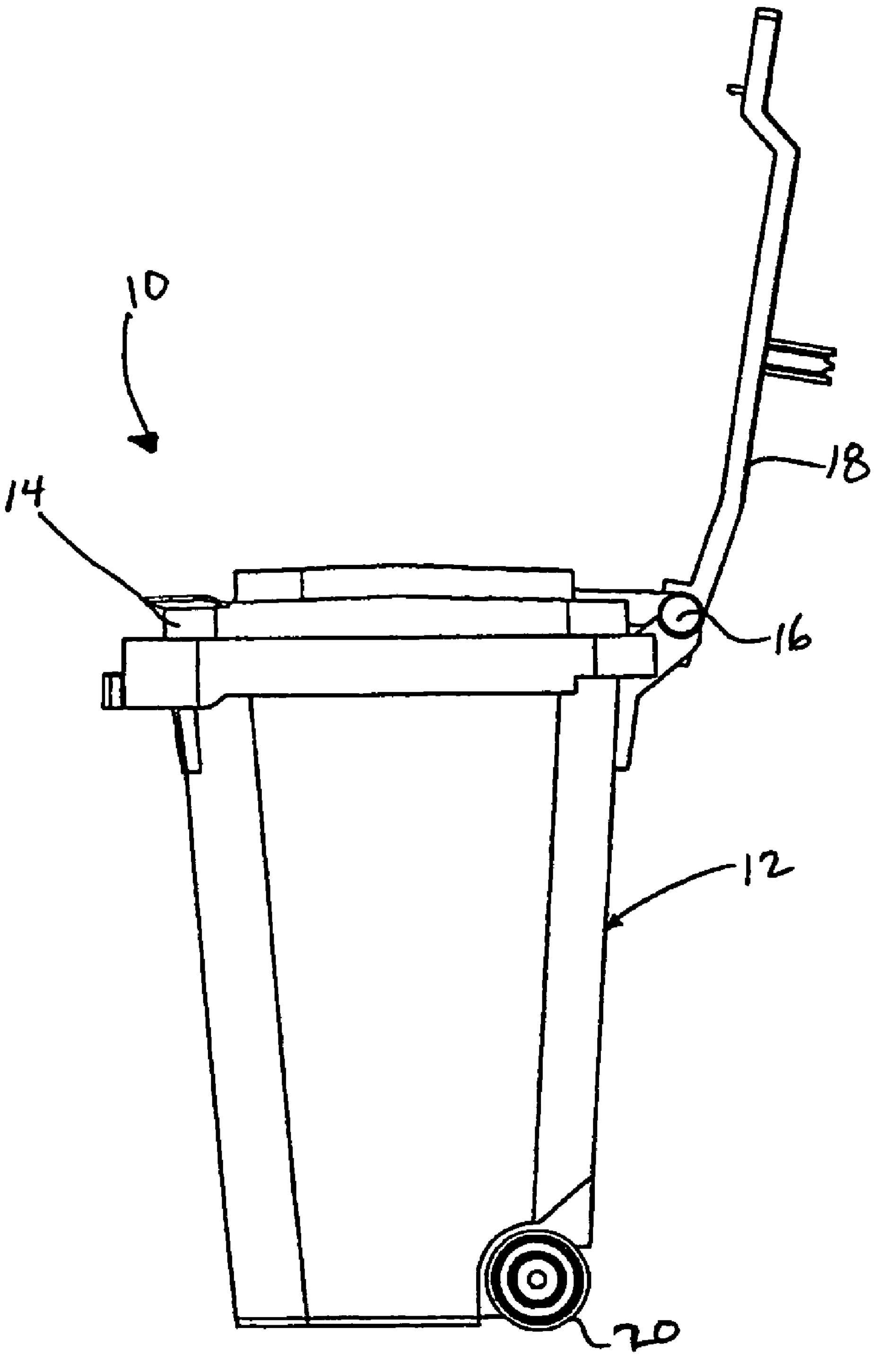
FIG. 5 is a side elevational view of that shown in FIG. 4.
Figure 6:
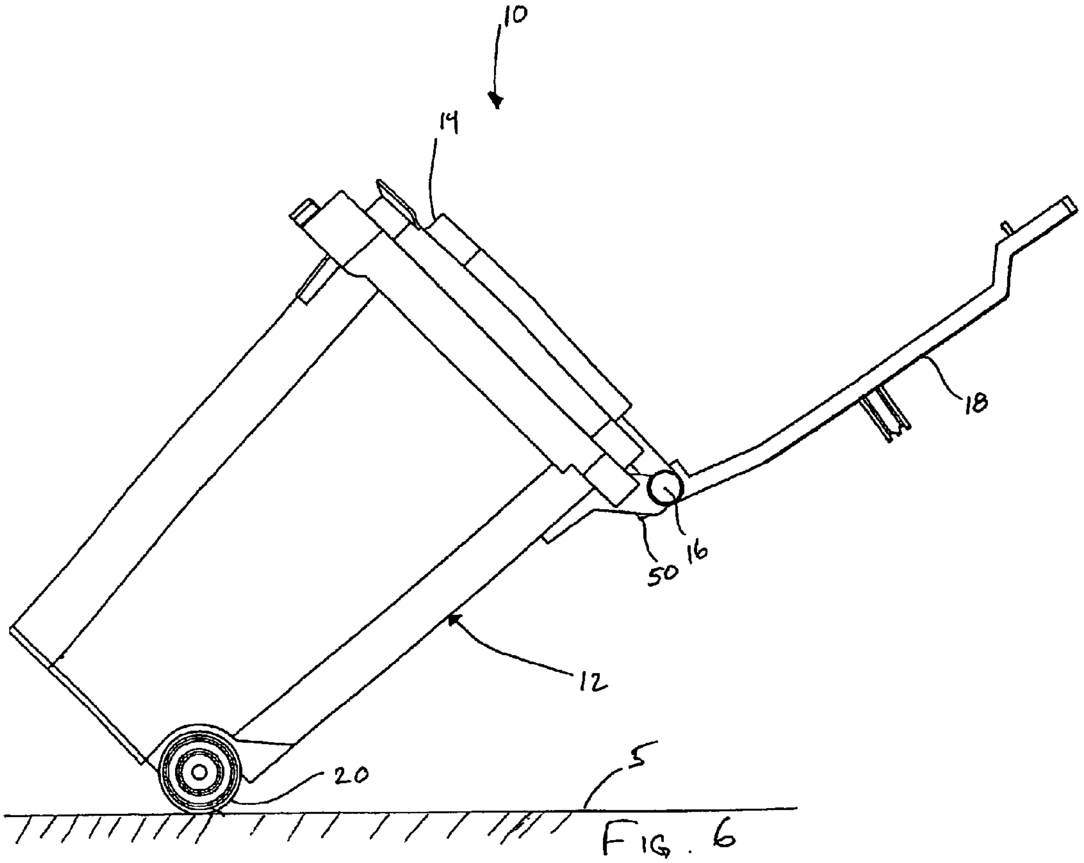
FIG. 6 is a side elevational view of the first embodiment, showing the handle member in its fully open position and the trash cart tilted upon its wheels for maneuverability.
Figure 7:
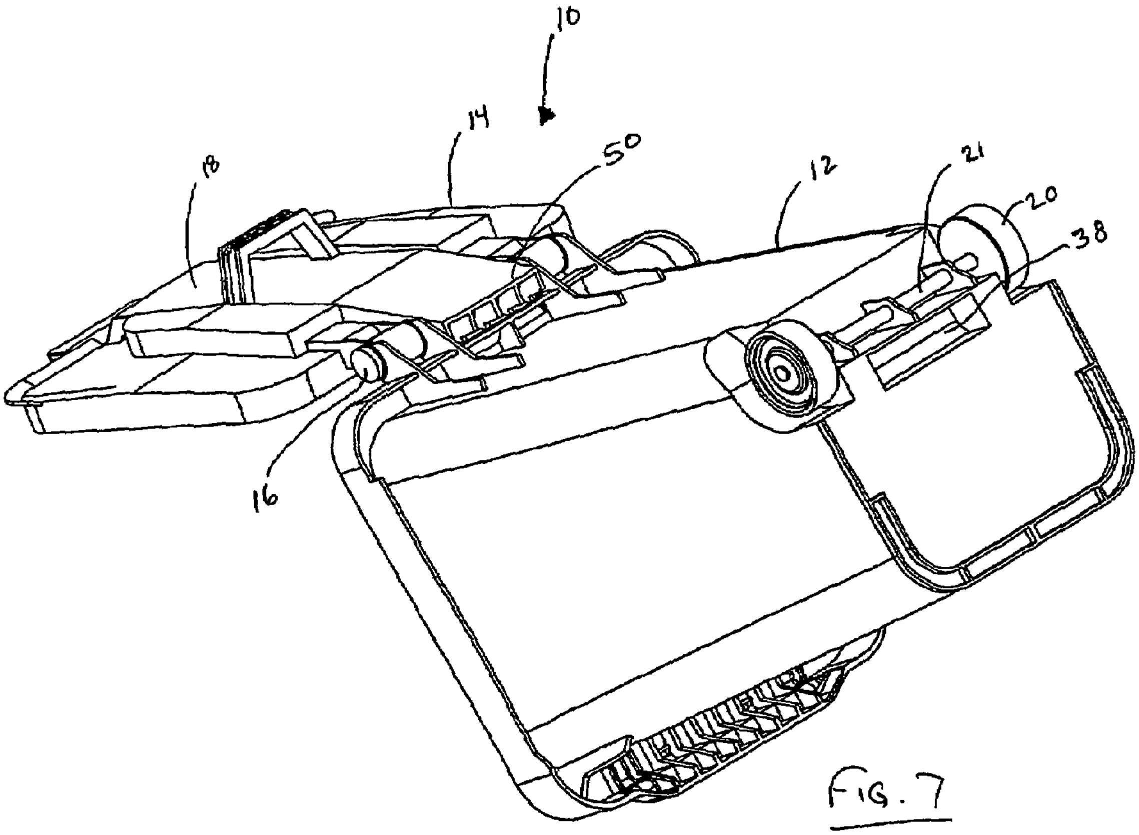
FIG. 7 is a bottom perspective view of the first embodiment.

Handle member 18 in this position may be locked in place to either lid 14 or body portion 12. As illustrated in FIG. 2, handle member 18 includes a pair of latch tabs 26 which are inserted into and received by corresponding openings 28 in body portion 12 in a latched or locked relationship (but may also be positioned such that latch tabs 26 are received by holes within lid 14.) In the embodiment shown, latch tabs serve to secure lid 14 to body portion 12. When a user desires to maneuver cart 10, handle member 18 is pulled forward slightly and raised (preferably by way of handling portion 30) in order to release latch tabs 26 from openings 28. Subsequently, handle member 18 is grasped at either first handling portion 30 or second handling portion 32, and rotated upwards and through the positions shown in FIGS. 2–4. FIGS. 4–6 illustrate handle member 18 in its fully open (use) position. As best shown in FIGS. 5–7, when in a fully opened position, a rear portion 50 of handle member 18 is stopped from further rotation by an interference fit with upper body portion 15. Accordingly, forces applied to handle member 18 in the open position causes cart 10 to be tilted onto wheels 20, such that cart 10 may be rolled to any desired location across surface 5 (see FIG. 6.)

Figure 8:
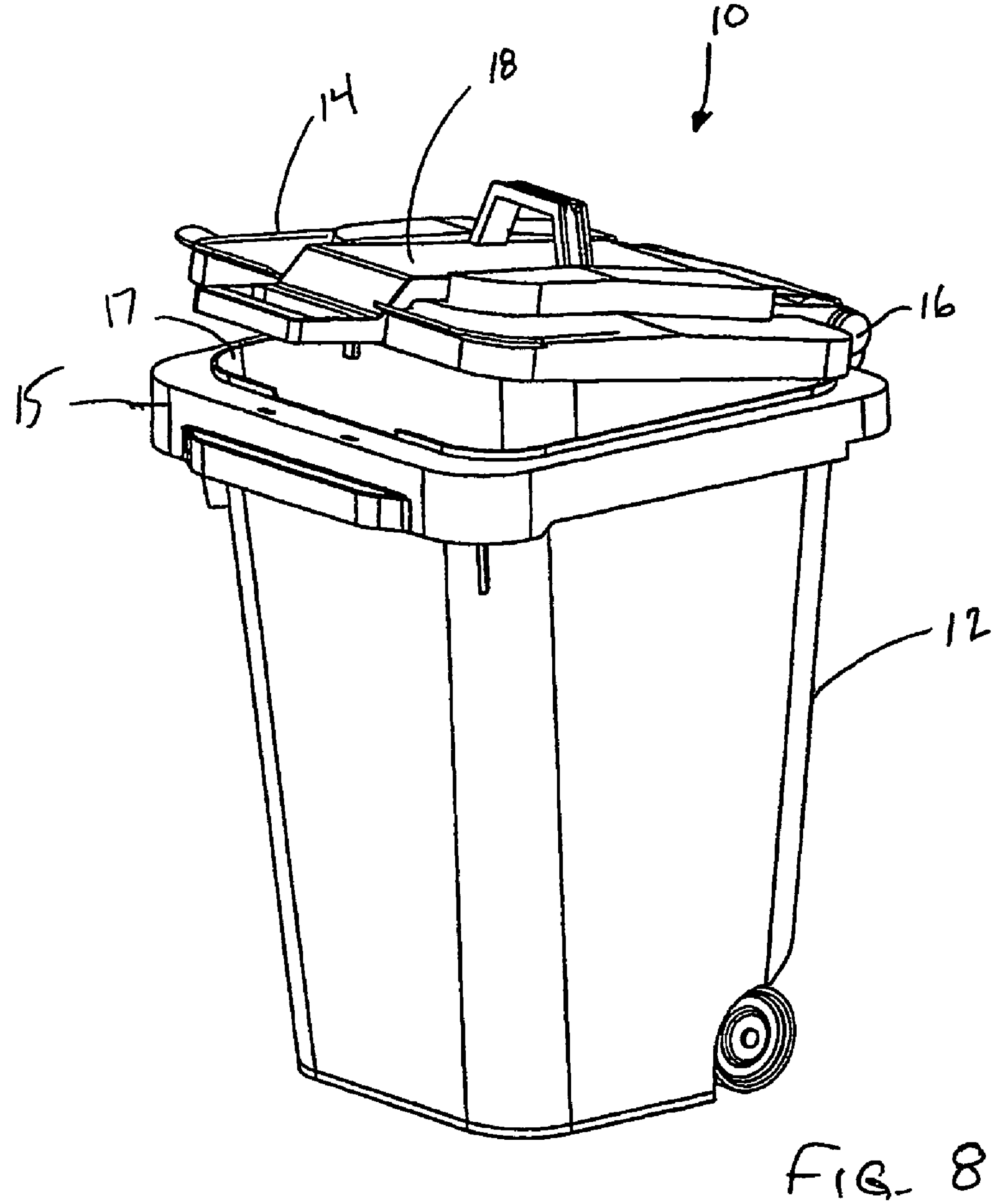
FIG. 8 is a perspective view of the first embodiment, showing the lid slightly open.
Figure 9:
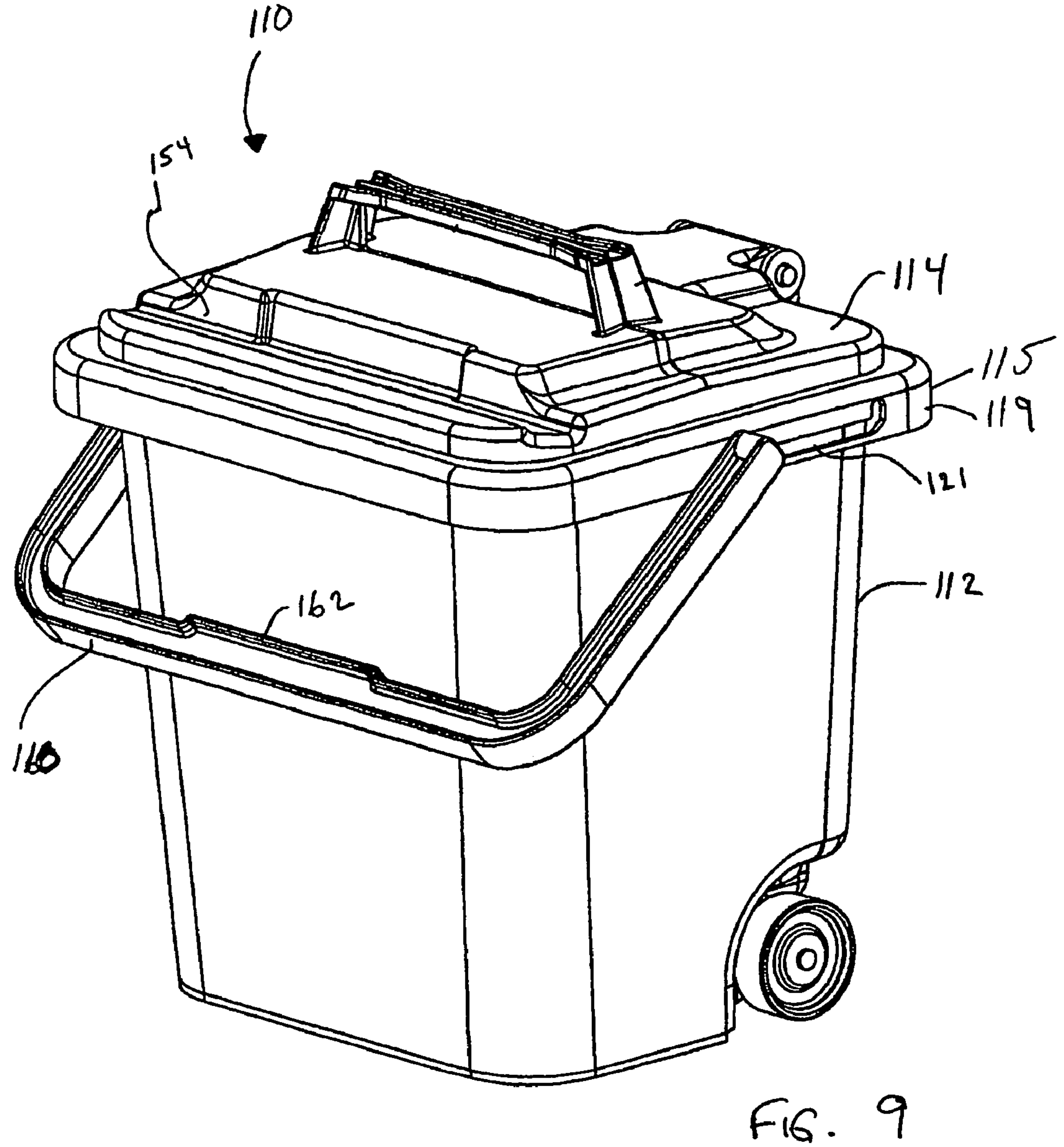
FIG. 9 is a perspective view showing a second embodiment of a trash cart according to the present invention, wherein the handle member is fully translated and rotated forward.
Figure 10:
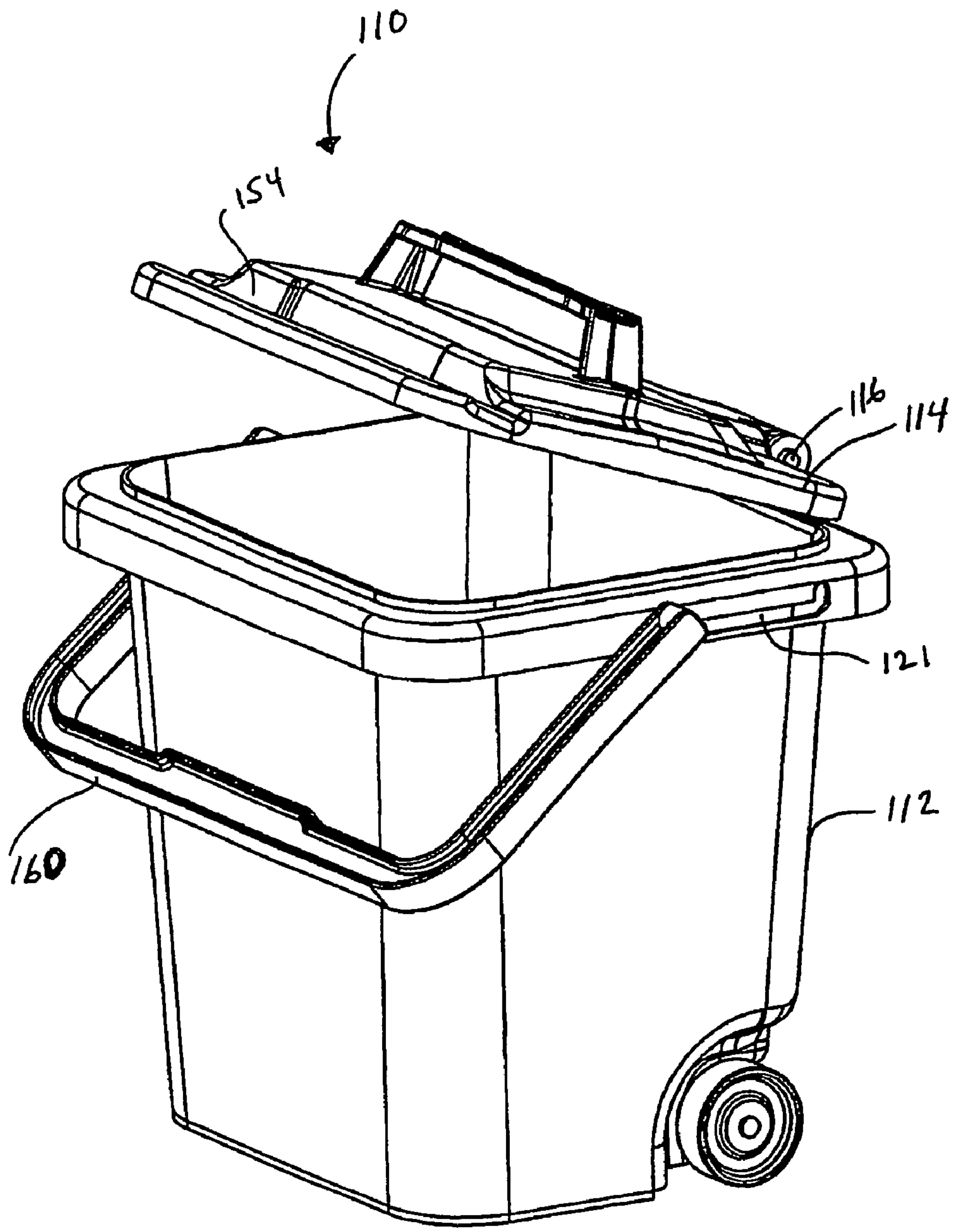
FIG. 10 is a perspective view similar to FIG. 9, but wherein the lid is slightly raised.
Figure 11:
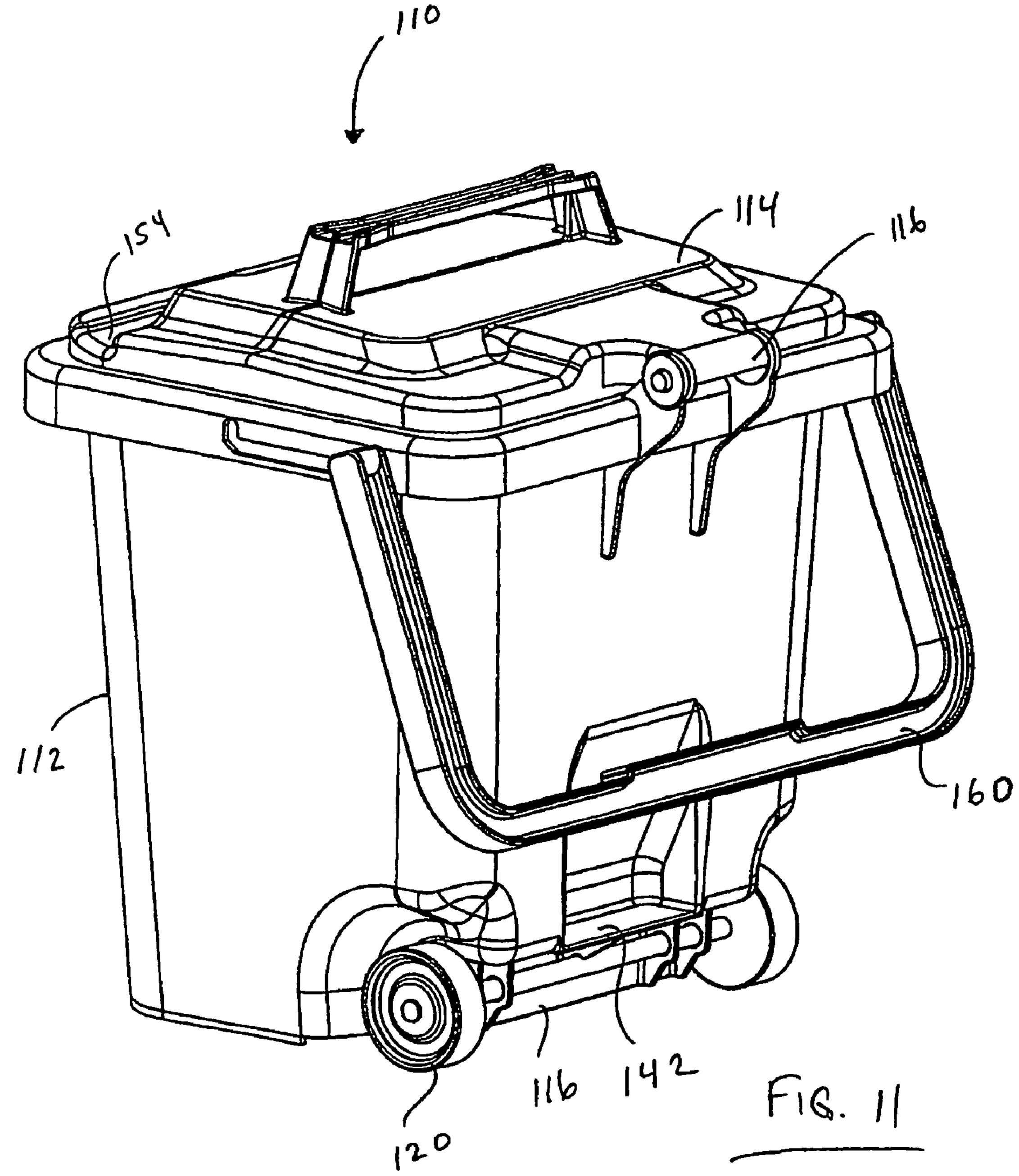
FIG. 11 is an alternate perspective view of the second embodiment, showing the rear of the cart, wherein the handle member is fully translated and rotated rearward.

In order to empty the trash contained therein, cart 10 may be lifted via first or second handling portions 30, 32 and also lifted at the bottom by hand pocket 38 (FIG. 7.) In most instances, when lid 14 is open as shown in FIGS. 7–8, handle member 18 remains secured to lid 14 via the aforementioned interference fit within recess 22.

FIGS. 9–14 illustrate a second embodiment of a trash cart 110 according to the present invention. Features of cart 110 that correspond to those of the first embodiment will carry a like reference numeral with a "1" prefix added. Cart 110 includes a body portion 112 and a lid member 114 which is pivotably attached to body portion 112 by way of hinge 116. Cart 110 also includes a handle member 160 which is attached to body portion 112 such that handle member 160 is able to pivot and translate with respect to body portion 112. Specifically, upper body portion 115 includes a rim 119 having an elongated and generally horizontally-disposed channel opening 121 along each side thereof. This allows handle member 160 to translate freely within opening 121 so that handle 160 may be translated forward and rotated to the front (FIGS. 9–10) or translated rearward and rotated to the rear (FIG. 11) of cart 110, such that lid 114 may be freely opened and closed (and thus cart 110 maybe lifted and emptied in these positions.)

Figure 12:
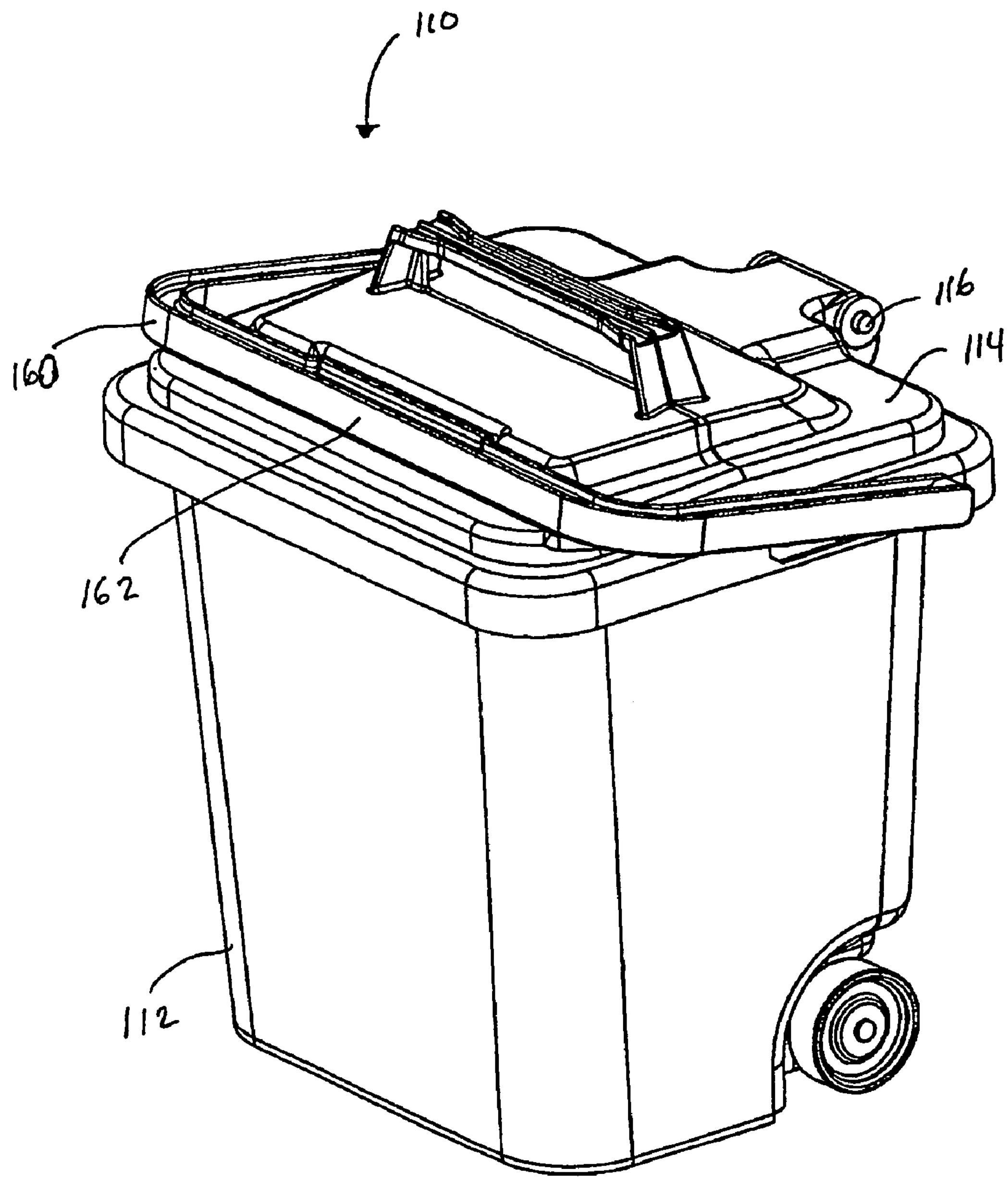
FIG. 12 is a perspective view of the second embodiment, wherein the handle member is translated rearward and rotated forward.
Figure 13:
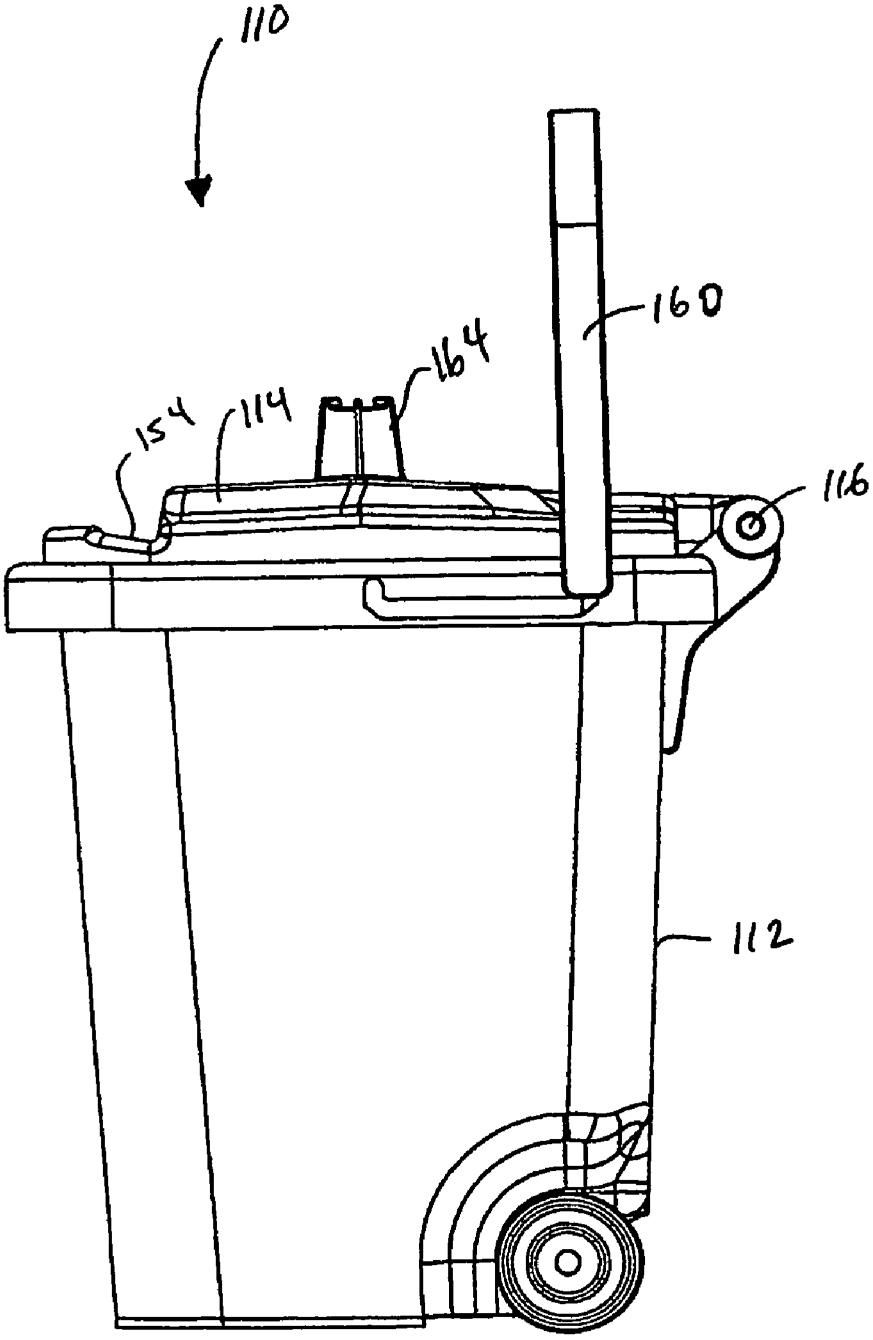
FIG. 13 is a side elevational view of the second embodiment, wherein the handle member is vertically disposed.
Figure 14:
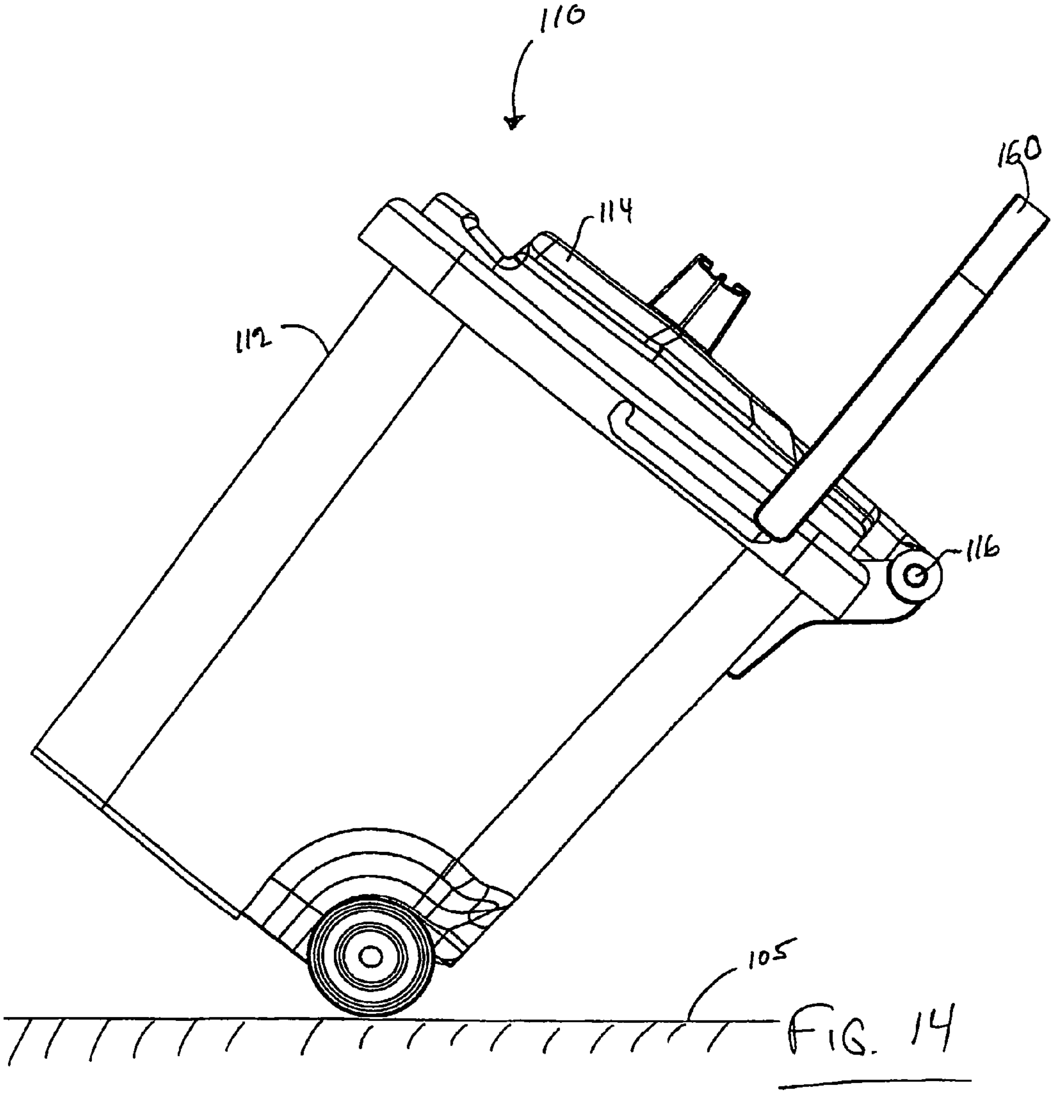
FIG. 14 is a side elevational view of the second embodiment, similar to FIG. 13 but where the cart is tilted upon its wheels upon handling the handle member.

As shown in FIG. 12, when handle member 160 is disposed rearwardly within channel 121 and rotated forward, a central portion 162 of handle member 160 is received by a recessed area 154 in lid 114. Handle member 160 in this orientation serves to impede movement of lid 114. Specifically, it is shown that lid 114 and handle member 160 are attached to body portion 112 along different hinge axes. Accordingly, when oriented as in FIG. 12, as lid 114 is raised, its movement is impeded by handle member 160, and thus prevent lid 114 from being opened.

In order to maneuver cart 110, handle member 160 is rotated upward and is stopped at its vertical position, such as by detents interfacing between handle member 160 and body portion 112. Accordingly, as with cart 10, sufficient force exerted upon handle member 160 causes cart 110 to tilt back upon its wheels 120 in order to be transported across surface 105 to a desired location. A user may also apply force to a foot step 142 disposed at the lower rear of body portion 112, in order to assist in the tilting of cart 110. Lid 114 also includes a centrally disposed handling portion 164.

Lastly, it is contemplated that for either embodiment of cart 10 or 110, when the handle member is in its closed/locked orientation and the lid is unable to open, that the user may grasp handle 32, 164 and lift and carry the cart to its desired location. Of course, this may be easier if the cart is relatively small. In such a design, the cart need not have wheels.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A trash cart comprising:

a body having an upper body portion defining an opening for loading and unloading trash from the body;

a lid for closing the opening of the body; and a handle member having an elongated arm pivotably attached to a rear portion of the upper body portion, a handling portion formed at an outer end of the arm, wherein the handle member is pivotable between a first position in which the arm extends across the lid, wherein said outer end latches to the upper body portion to impede movement of the lid and a second position in which the arm of the handle member extends generally away from the body and in which the lid is able to freely open.

2. The trash cart of claim 1 wherein the lid is pivotably attached to the body along a hinge axis.

3. The trash cart of claim 2 wherein the handle member is pivotable relative to the lid and the body.

4. The trash cart of claim 1 further including a hinge member pivotably attaching the handle member and the lid to the body.

5. The trash cart of claim 1 wherein the handle member includes the first handling portion and a second handling portion.

6. The trash cart of claim 5 wherein the first handling portion is generally perpendicular to the second handling portion.

7. The trash cart of claim 6 wherein a rearward portion of the handle member is pivotably attached to the body and wherein the first handling portion extends from a forward portion of the handle member opposite the rearward portion.

8. The trash cart of claim 1 wherein the lid is pivotably attached to the body along a first hinge axis and the handle member is pivotably attached to the body along a second hinge axis, spaced from the first hinge axis.

9. A trash cart comprising:

a body having an upper body portion defining an opening for loading and unloading trash from the body;

a lid for closing the opening of the body, the lid pivotably attached to the body along a first hinge axis; and a handle member pivotably attached to a rear portion of the upper body portion along a second hinge axis, spaced from the first hinge axis, wherein the handle member is slidably and pivotably attached to the body portion, wherein when the handle member is oriented in a first position its cooperates with the lid to impede movement of the lid, and when the handle member is oriented in a second position, the lid is able to freely open.

10. The trash cart of claim 9 wherein the handle member is rotatable to a forward position in which a portion of the handle member is received within a recess in the lid when the lid is in a closed position to prevent opening of the lid.

11. The trash cart of claim 10 wherein the handle member is slidable toward the first hinge axis of the lid to a rearward position before being rotatable to the forward position and being received in the recess.

12. The trash cart of claim 1 wherein the handle member is selectively lockable relative to the body in order to prevent rotation of the handle member.

13. The trash cart of claim 1 wherein the handle member is pivotably attached to the body at a rearward portion of the handle member and wherein the handle member is selectively latched to the body in order to prevent rotation of the handle member and the lid.

14. The trash cart of claim 13 further including at least one latch tab received by at least one opening in order to latch the handle member to the body.

15. The trash cart of claim 9 wherein the lid includes a recess for receiving the handle member and securing the handle member to the lid.

16. The trash cart of claim 1 further including at least one wheel on a lower rear portion of the body.

17. A trash cart comprising:

a hollow body having an upper portion defining an opening for loading and unloading waste therefrom;

a lid for closing said opening for loading and unloading trash from the hollow body; and a handle member having an arm with a first end pivotably attached to the upper body portion, the handle member including a first handling portion on a second end of the arm opposite the first end, wherein when the handle member is rotated in a forward position the arm extends across the lid and the second end of the arm is latched to the body to impede movement of the lid, and when the handle member is oriented in a rearward position, the arm extends away from the body and the lid is able to be opened; and wherein the lid is pivotably attached to the body along a hinge axis and the handle member is pivotably attached to the body along the hinge axis, the handle member being pivotable relative to the body and the lid.

18. A trash cart comprising:

a body having an upper body portion defining an opening for loading and unloading trash from the body;

a lid for closing the opening of the body, the lid pivotably attached to a rear portion of the upper body portion;

a handle member having an elongated arm having a rearward portion pivotably attached to the upper body portion, the handle member including a first handling portion extending from a forward portion of the arm of the handle member and a second handling portion extending generally from a middle portion of the arm the handle member, the second handling portion extending perpendicularly to the middle portion of the arm; wherein the second handling portion projects from the middle portion of the arm in a direction generally perpendicular to the arm and not parallel to the hinge axis; and at least one wheel rotatably mounted on a bottom of the body.

19. The trash cart of claim 18 further including a hinge member having a hinge axis, the lid and the handle member each attached to the body by the hinge member and independently rotatable about the hinge axis.

20. The trash cart of claim 19 wherein the forward portion of the handle member is selectively latchable to the body portion when the handle member is rotated to a forward position.

* * * * *